W. C. STEPHENS.
CRADLE FOR ROCK DRILLS AND OTHER MACHINES.
APPLICATION FILED JUNE 2, 1911.
1,047,586.
Patented Dec. 17, 1912.
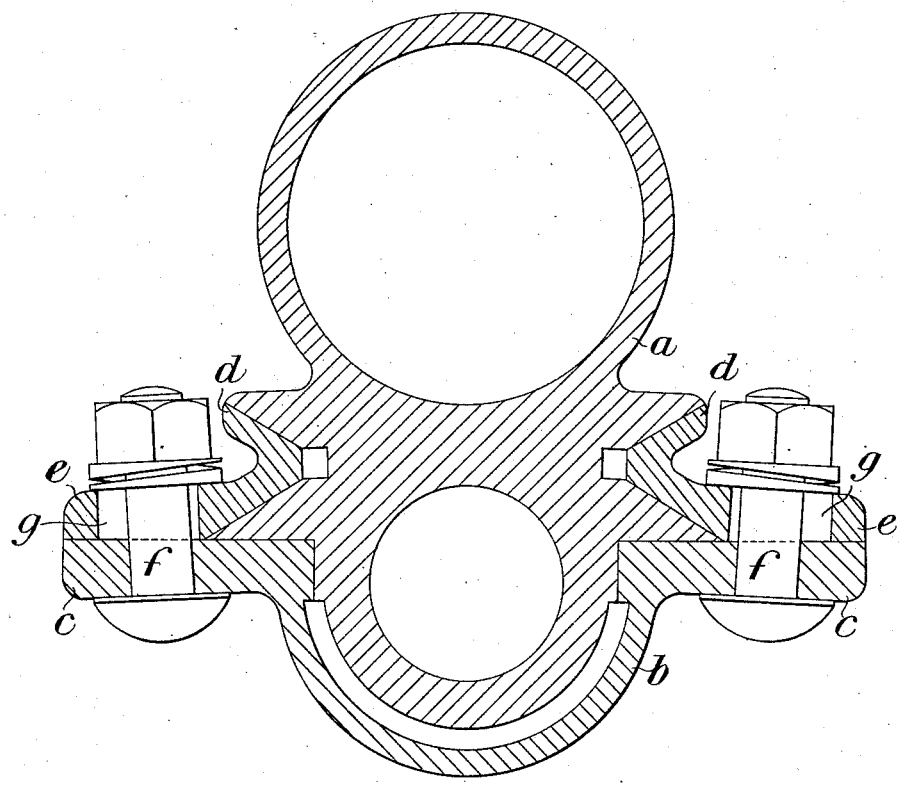

UNITED STATES PATENT OFFICE.

WILLIAM CHARLES STEPHENS, OF CORNWALL, ENGLAND.

CRADLE FOR ROCK-DRILLS AND OTHER MACHINES.

1,047,586.  Specification of Letters Patent.  Patented Dec. 17, 1912.

Application filed June 2, 1911. Serial No. 630,849.

*To all whom it may concern:*

Be it known that I, WILLIAM CHARLES STEPHENS, a subject of the King of Great Britain, residing at The Climax Drill Works, Carn Brea, Cornwall, England, have invented new and useful Improvements in or Connected with Cradles for Rock-Drills and other Machines, of which the following is a specification.

My invention relates to the cradles of rock drills and to that class of cradle wherein the adjustable guides of the cradle and the flanges upon which the guides rest are made of more or less wedge shape in transverse section, that is to say have their surfaces inclined to each other, while the outer surfaces of the said guides and flanges, against which the bolt heads and nuts bear, are made parallel, with the object of preventing the inadvertent movement of the said adjustable guides after they have been fixed in position. In constructing such cradles heretofore, it has been usual to make the surfaces of the flanges upon which the guides rest in planes which converge toward the center of the cradle, the under surfaces of the said flanges being horizontal. This construction, however, is more or less difficult owing to the necessity for facing the flanges in different planes.

The object of my invention is to remove this difficulty and to this end it consists in facing the surfaces upon which the adjustable guides rest in a horizontal plane and in forming the under surfaces of the said flanges and the upper surfaces of the guides in planes inclined to the horizontal.

In the old type of construction above referred to, it was necessary, owing to the converging plane principle on which it was designed, that there should be a separate setting for each operation on the converging planes, which entailed not only the accurate lining off of the work, but also accurate setting, and consequently much loss of time resulted. The same difficulty would be met in regard to a cylinder set with converging planes. By my construction, the cradle is set once, and all necessary operations are carried out with that one setting, and this is possible from the fact that all cut surfaces are of the horizontal and vertical type so that when the work is done, as is usual, in a vertical milling machine, the necessity of lining off the work is avoided, and the entire cradle can be milled and finished with one setting.

The invention will be readily understood by reference to the accompanying drawing which shows a transverse section through a half cylinder and a half cradle of a rock drill having my improvements arranged in conjunction therewith.

$a$ indicates the cylinder, $b$ the cradle upon which the cylinder is carried and which is formed with the flanges $c, c$ faced in a horizontal plane, and $d, d$ the adjustable guides between which the cylinder slides and which are provided with the flanges $e, e$, secured to the flanges $c, c$ by the bolts $f, f$ the holes $g, g$ in the flanges $e, e$ through which the said bolts pass, being slotted to allow of the adjustment of the guides in relation to the bolts.

It will be noticed that the upper surfaces of the flanges $e, e$ of the adjustable guides, $d, d$ and the lower surfaces of the flanges $c, c$ are in planes inclined to the horizontal, but parallel to each other, so that the bolts and nuts will lie properly against the said surface.

Having now particularly described and ascertained the nature of my said invention and in what manner the same is to be performed, I declare that what I claim is:—

In a rock drill cradle, the combination with flanges having their upper surfaces horizontal, of adjustable guides having a portion of their lower surfaces horizontal to conform with the upper surfaces of said flanges, said flanges having their lower surfaces inclined and said guides having their upper surfaces inclined and parallel with one another.

WILLIAM CHARLES STEPHENS.

Witnesses:
W. TRUSCOTT,
W. J. HANNAM.

Copies of this patent may be obtained for five cents each, by addressing the "Commissioner of Patents, Washington, D. C."